No. 766,839.  
Patented August 9, 1904.

UNITED STATES PATENT OFFICE.

JAMES B. OLNEY, OF NEW YORK, N. Y., ASSIGNOR OF ONE-HALF TO JOHN H. BELL, OF BROOKLYN, NEW YORK.

COMPOSITION FOR BOWLING-BALLS, &c.

SPECIFICATION forming part of Letters Patent No. 766,839, dated August 9, 1904.

Application filed December 16, 1903. Serial No. 185,409. (No specimens.)

*To all whom it may concern:*

Be it known that I, JAMES B. OLNEY, a citizen of the United States of America, residing in the borough of Manhattan, in the city, county, and State of New York, have invented an Improved Composition for Bowling-Balls, &c., of which the following is a specification.

My invention relates to the minor plastics and the special class of compositions such as are capable of use in the manufacture of bowling-balls, billiard-balls, bicycle-rims, handle-bar grips, and many other useful and ornamental articles.

My invention is particularly designed for making bowling-balls, which are ordinarily made of lignum-vitæ. The latter, for large sizes of balls particularly, is expensive material and is likely to become more expensive.

One of the main objects of my invention is to provide an economical substitute for lignum-vitæ in the manufacture of such balls. Such a substitute must have, first, great toughness and durability; secondly, freedom from all cracks, fissures, and air-holes, both internally and externally; thirdly, the proper quality of weight or specific gravity, and, fourthly, a capacity for taking a surface-polish as smooth as hardwood.

Attempts have been made to produce bowling-balls of compositions; but I believe that for one reason or another such attempts have not been successful.

I have discovered a composition from which to make bowling-balls and other articles having all the requisites of homogeneousness, toughness, durability, weight, and capacity for polish.

This composition consists of silicate-of-soda solution, precipitated chalk, fine iron-filings, and fibers—such, for example, as cotton, oakum, or asbestos. I may use paper-making fibers for the purpose, such as powdered fibers from partially-prepared paper or dried paper-pulp ground up. The silicate-of-soda solution, precipitated chalk, fine iron-filings, and the fibers are thoroughly mixed together by hand or machinery, and after being partly dried out a quantity of the mixture is packed into a mold and baked until all moisture has been driven off and the ingredients have become baked into a solid and homogeneous mass free from all cracks, fissures, or air-holes. The molded mass is then put into a lathe to be turned down to a perfect sphere of the proper size and weight and to give it the required surface-polish, in the case of a bowling-ball, for example.

While I do not wish to confine myself to special proportions of the several elements of the composition, I may observe by way of example that satisfactory results will be obtained by mixing together one gallon of silicate-of-soda solution, about two pounds of precipitated chalk, about two pounds of fine iron-filings, and about one and a half pounds of fibers. For a heavier bowling-ball of a given size a larger proportion of iron-filings will be used. For a lighter ball or other article less iron-filings may be used. If desired, any suitable coloring-matter, such as oxid of iron, may be added.

I claim as my invention—

1. As a new article of manufacture, a composition for bowling-balls, &c., consisting of silicate of soda, precipitated chalk, fine iron-filings and fibers, substantially as described.

2. As a new article of manufacture, a composition for bowling-balls, &c., consisting of about one gallon of silicate of soda, two pounds of precipitated chalk, two pounds of iron-filings and one and a half pounds of fibers, substantially as described.

In testimony whereof I have signed my name to this specification in the presence of two subscribing witnesses.

JAMES B. OLNEY.

Witnesses:
 HUBERT HOWSON,
 F. WARREN WRIGHT.